Figure 1:
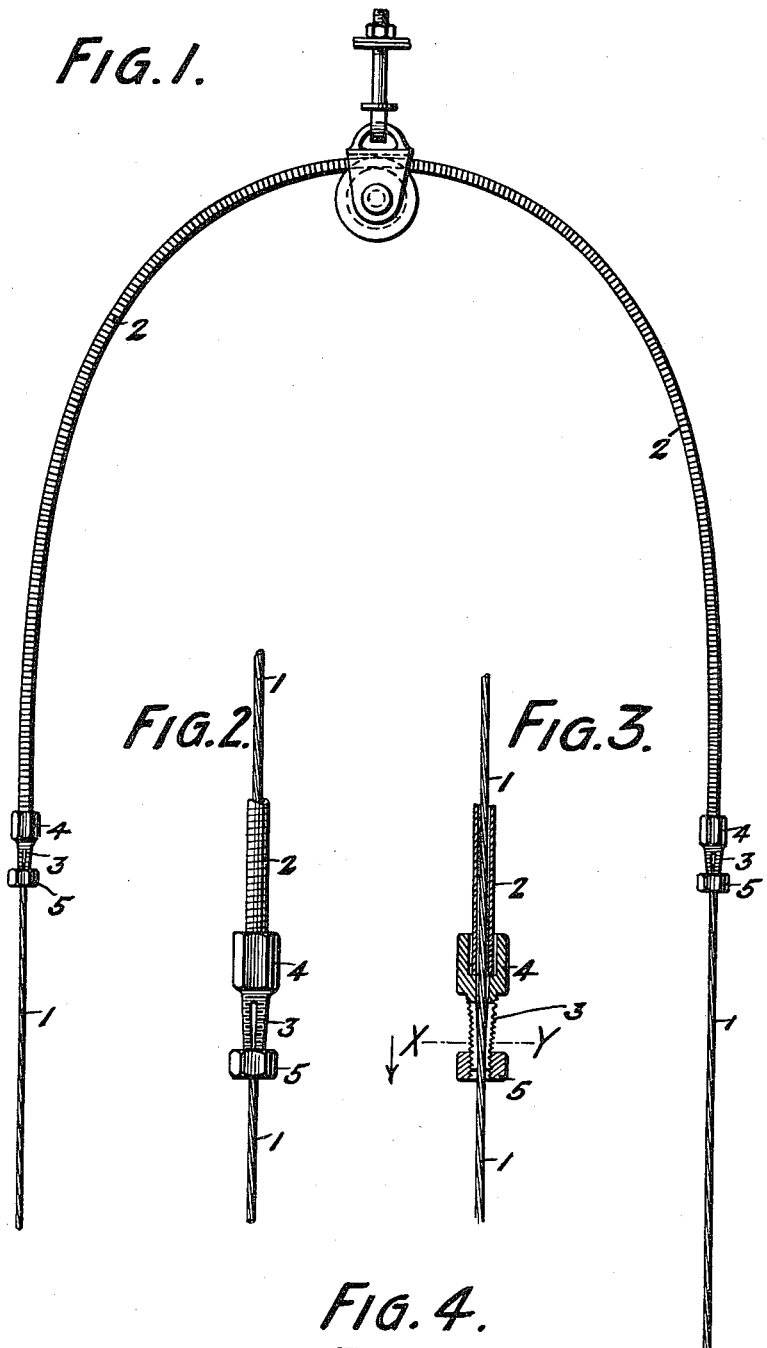

W. M. WRIGHT, & C. L. PASHLEY.
FLEXIBLE CONNECTION OR CONTROL WIRE FOR MECHANISM PARTICULARLY APPLICABLE FOR USE ON AIRCRAFT.
APPLICATION FILED MAY 6, 1918.

Patented Sept. 17, 1918.

Inventors
William Morby Wright
Cecil Laurence Pashley
By
their Attorneys.

UNITED STATES PATENT OFFICE.

WILLIAM MOXLY WRIGHT, OF CORK, IRELAND, AND CECIL LAWRENCE PASHLEY, OF BALHAM, ENGLAND.

FLEXIBLE CONNECTION OR CONTROL-WIRE FOR MECHANISM PARTICULARLY APPLICABLE FOR USE ON AIRCRAFT.

1,279,208. Specification of Letters Patent. Patented Sept. 17, 1918.

Application filed May 6, 1918. Serial No. 232,909.

*To all whom it may concern:*

Be it known that we, WILLIAM MOXLY WRIGHT and CECIL LAWRENCE PASHLEY, subjects of the King of Great Britain, residing, respectively, at Cork, Ireland, and Balham, in the county of London, England, have invented certain new and useful Improvements in Flexible Connections or Control-Wires for Mechanism Particularly Applicable for Use on Aircraft, and of which the following is a specification.

This invention refers to improvements relating to flexible connections for controlling or imparting motions to movable parts particularly applicable for use on aircraft.

The object of the present invention is to provide a protection for flexible connections employed as above, which connections commonly consist of braided wire, wire cable or the like, that is to say to provide a protection device for such flexible connections at those parts of same which are exposed to friction where they pass over pulleys or guides, and which protection device can be readily removed to permit the flexible connection being inspected and again replaced and fixed in position thereon, and this without any alteration in the construction of the flexible connection itself.

According to this invention we provide a protective flexible metal sheath through which the flexible connection passes, such sheath being composed for instance of spirally wound metal, the sheath only extending around the flexible connection at those parts and for such a length where the flexible connection is subjected to the friction of pulleys or guides. Now it is highly essential that the sheath so formed shall be capable of being slid when desired upon the flexible connection to enable the condition of that part of the flexible connection normally within the sheath, to be inspected from time to time and this will be well appreciated when it is remembered that this invention is particularly applicable to aircraft.

To maintain the sheath normally in position on the connection and to enable said sheath to be slid to permit inspection when required of the part usually covered by the sheath, we provide some suitable device located at each end of the sheath to form abutments therefor, and which abutment devices have means by which they can be secured by friction or gripping action to the flexible connection, or can be easily released therefrom. By such means the sheath is held normally by the gripping action against any sliding movements relatively to the flexible connection, and by releasing the mechanical gripping appliances the sheath may be slid away from the part of the flexible connection which it normally covers, and thereby the said connection can be inspected from time to time, while when *in situ* the sheath protects the flexible connection from the abrading action of the guides or pulleys over which it passes.

The invention will be described with reference to the accompanying drawing.

Figure 2:
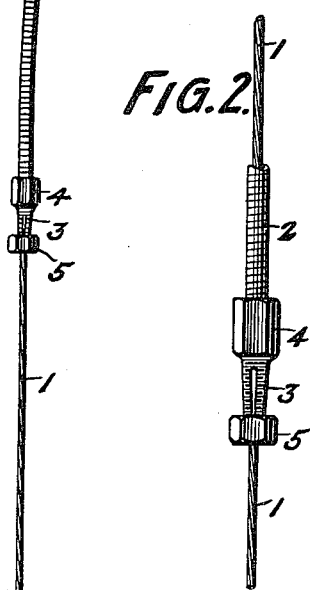
Figure 3:
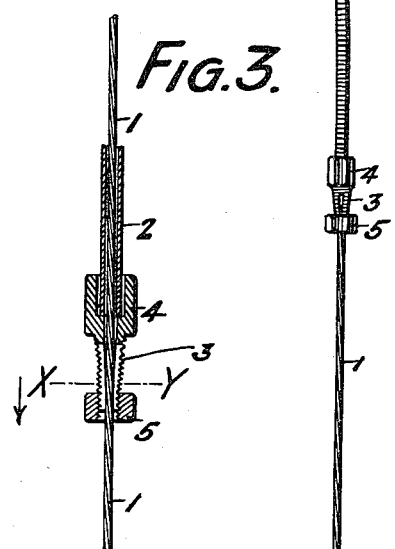
Figure 4:
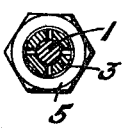

Figure 1 shows in elevation a portion of a flexible connection provided with the protective sheath according to this invention, and illustrating the connection passing over a pulley. Fig. 2 is an elevation drawn to a larger scale than the previous figure and illustrating an example of construction of a gripping device, Fig. 3 being a vertical section of the parts shown at Fig. 2, and Fig. 4 being a horizontal section on the line X—Y of Fig. 3 but drawn to a still further increased scale.

Referring to the drawings, the flexible connection 1 may be of any approved construction or material, and upon this flexible connection 1 is slid the sheath 2 which is made to fit so that it can be easily slid on the flexible connection, and also should be made so that it is flexible, and to this end the sheath 2 may be composed as aforesaid of spirally wound metal. The flexible sheath is preferably non-compressible in the direction of its length and therefore the convolutions of helically wound metal, when the sheath is so made, are in contact with one another.

Gripping devices of any suitable construction are then as aforesaid applied in such manner as to secure the ends of the sheath 2 to the flexible connection 1 which passes through it, and in the construction shown such a gripping appliance consists of a tube 3 slid onto the flexible connection and formed with a head 4 which receives the end of the flexible tube 2, while the screwthreaded portion of the tube 3 is divided in the direction of its axis and is caused to assume a conical configuration; a nut 5 is then passed over the flexible connection 1, and by screwing the nut 5 onto the screwthreaded portion of the tubular member 3 the latter will be contracted and caused to clamp the flexible connection 1. A similar clamping device is fitted to receive and hold each end of the sheath 2, and when in position these clamping devices prevent the sheath shifting along the flexible connection 1.

By this arrangement the flexible connection is armored where it passes over pulleys or guides, while at the same time by releasing the clamping devices the sheath 2 can be displaced so as to permit of inspection of the part of the flexible connection which the sheath normally covers.

What we claim as our invention and desire to secure by Letters Patent is:—

1. In flexible connections for the purposes specified; the combination with a flexible tubular metal sheath through which the flexible connection is passed to protect that part of the flexible connection which passes over a guide or pulley; of means for detachably connecting the sheath to the flexible connection in the position of use and to permit of the release of said sheath from said connection to permit said sheath to be slid out of place for inspection of that part of said flexible connection which said sheath normally covers.

2. In flexible connections for the purposes specified; the combination with the flexible connection, a flexible tubular metal sheath through which said connection freely passes, said sheath extending for a length and being located upon said connection where the latter would be exposed to friction; of abutment devices on said flexible connection one to support each end of said sheath against endwise movement, and means by which each abutment device can be caused to frictionally grip said connection and be released therefrom when required.

3. In flexible connections for the purposes specified; the combination with the flexible connection, a flexible tubular metal sheath non-compressible in the direction of its axis and through which said connection freely passes, said sheath extending for a length and being located upon said connection where the latter would be exposed to friction; of abutment devices on said flexible connection one to support each end of said sheath against endwise movement, and means by which each abutment device can be caused to frictionally grip said connection and be released therefrom when required.

4. In flexible connections for the purposes specified; the combination with the flexible connection, a flexible tubular non-compressible sheath composed of helically wound metal the convolutions of which are in contact with each other, and through which sheath said connection freely passes, said sheath extending for a length and being located upon said connection where the latter would be exposed to friction; of abutment devices on said flexible connections one to support each end of said sheath against endwise movement, and means by which each abutment device can be caused to frictionally grip said connection and be released therefrom when required.

5. In flexible connections for the purposes specified; the combination with the flexible connection, a flexible tubular metal sheath through which said connection freely passes, said sheath extending for a length and being located upon said connection where the latter would be exposed to friction; of abutment devices on said flexible connection one to support each end of said sheath against endwise movement, each of said abutment devices comprising a tube slidden onto said flexible connection, a head on one end of said tube to receive and form an abutment for the end of the sheath, a screwthread formed on the opposite end of the tube, said opposite end being divided in the direction of the axis and formed conical, a nut on said tube engaging said screwthread on the divided part thereof to contract said divided tubular end of said abutment device to clamp same to said flexible connection.

In witness whereof we have hereunto set our hands in the presence of two witnesses.

WILLIAM MOXLY WRIGHT.
CECIL LAWRENCE PASHLEY.

Witnesses:
   THOMAS W. ROGERS,
   WILLIAM A. MARSHALL.